United States Patent [19]
Waterloo

[11] 3,764,253
[45] Oct. 9, 1973

[54] SIDE FLOW DIVERTER FOR PARISON EXTRUDING HEAD

[75] Inventor: William C. Waterloo, York, Pa.

[73] Assignee: Graham Engineering Corporation, York, Pa.

[22] Filed: Mar. 12, 1971

[21] Appl. No.: 123,595

[52] U.S. Cl................................. 425/466, 425/381
[51] Int. Cl................................................. B29f 3/04
[58] Field of Search................... 425/326, 380, 381, 425/466; 264/209

[56] References Cited
UNITED STATES PATENTS

| | | | |
|---|---|---|---|
| 3,029,474 | 4/1962 | Voight et al. | 264/209 |
| 3,111,713 | 11/1963 | Kaplan | 425/467 |
| 3,230,582 | 1/1966 | Hoffman et al. | 425/377 X |
| 3,369,272 | 2/1968 | Martin, Jr. et al. | 264/163 X |
| 3,402,427 | 9/1968 | Christofar et al. | 425/466 X |

FOREIGN PATENTS OR APPLICATIONS

| | | | |
|---|---|---|---|
| 49,996 | 9/1966 | Germany | 425/381 |
| 1,211,379 | 2/1966 | Germany | 264/209 |

*Primary Examiner*—R. Spencer Annear
*Attorney*—C. Hercus Just

[57] ABSTRACT

A parison extruding head provided with an inlet at one side thereof, transverse to the axis thereof, and including a diverter to change the direction of movement of plasticated resin to flow axially of the extruder head from the entering direction. The diverter effects smooth transition in the path of movement of such plasticated resin without impeding or entrapping any of the same, thereby avoiding burning of the resin or other deleterious effects therein.

8 Claims, 6 Drawing Figures

INVENTOR.
William C. Waterloo

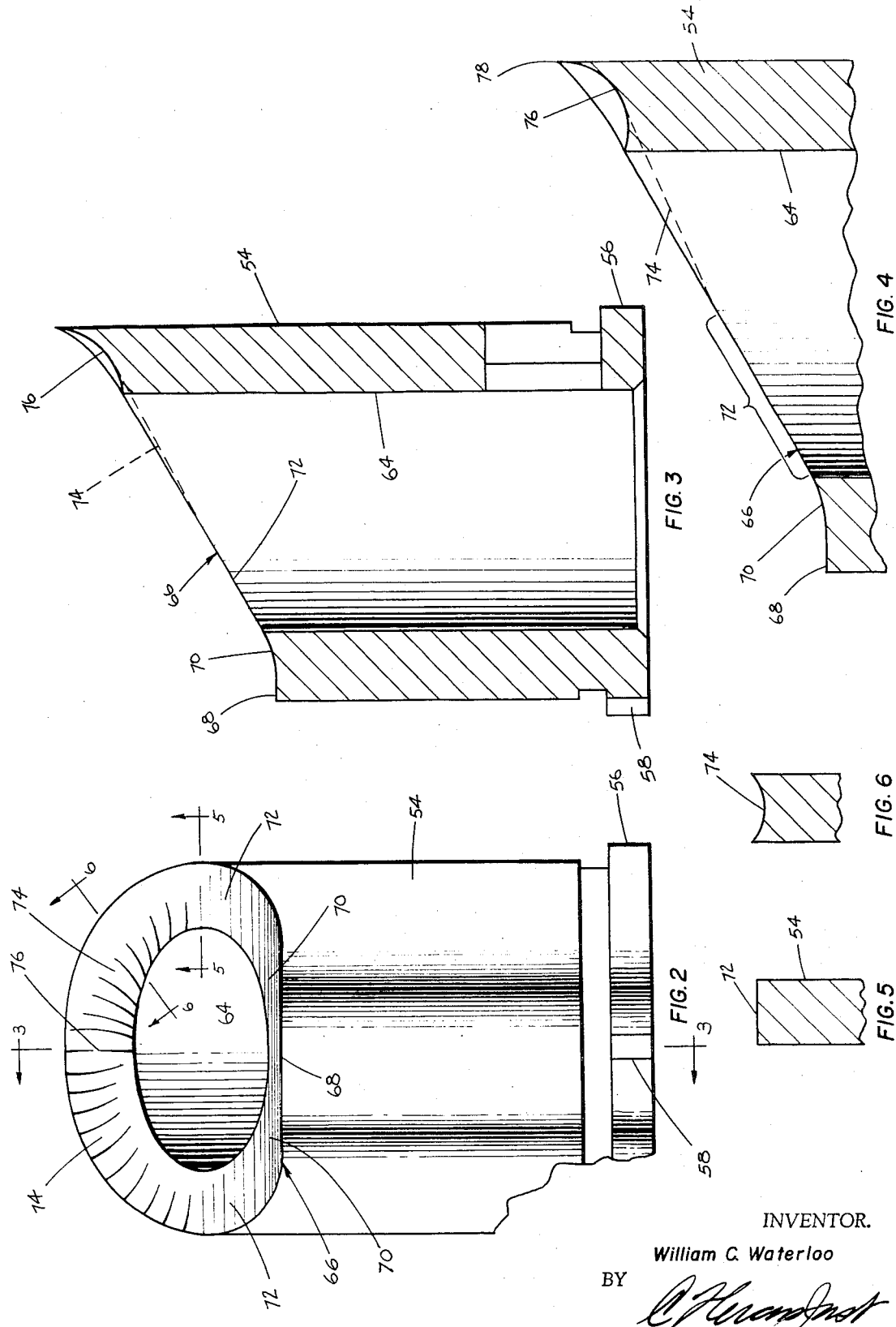

SIDE FLOW DIVERTER FOR PARISON EXTRUDING HEAD

BACKGROUND OF THE INVENTION

In the art of extruding tubular parisons of synthetic plastic resins, it has been common practice heretofore to direct plasticated resin into one end of a parison extruding head and feed the resin axially through said end for formation into the desired tubular parison. Under such circumstances, no particular difficulties are experienced in such feeding of the plasticated resin through the head so as to extrude the sleeve-like or tubular parison therefrom.

It now has been found that there are certain advantages to extruding a plasticated, homogenious parison substantially vertically upward from the parison head incident to delivering the same to a movable series of molds which, upon having the parison disposed therein, move upwardly while the parison is being inflated within the mold to conform it to the walls of the mold cavity and thereby form an article of desired shape.

It is quite conventional in forming hollow objects, such as containers, by blow-molding techniques, to melt and otherwise plasticate the resin into homogenious consistency and discharge the same from an extruder in which the plastication is effected by appropriate heating techniques. Such extruders normally are mounted in a horizontal position and the conventional discharge therefrom likewise is along a horizontal axis. Under such circumstances, to change the direction of the extruded plasticated resin so as to extend vertically upward, for example, has heretofore presented substantial difficulty. It is, in fact, quite commonly acknowledged in the plastics industry that it has been virtually impossible to extrude a parison from plasticated polyvinylchloride (PVC), acrylonitrile, and other similar thermoplastic synthetic resins from an extruder head in which the resin entered the head in a horizontal direction from one side thereof and the discharge nozzle extended perpendicularly thereto, whereby the resin changed direction of discharge approximately 90° from the direction at which it entered the head.

Extruder heads in which such change in direction has been attempted previously were of such nature that retardation of flow and related entrapment of certain portions of the resin occurred to such an extent that burning and charring of the entrapped resin took place with corresponding objectionable results in the parison produced by such an extruding head.

It is therefore one object of the present invention to provide an improved parison extruding head in which means are provided to effect smooth and unimpeded transition in the direction of movement of plasticated resin from an inlet at one side of the extruding head to a direction of movement of said resin of approximately 90° so as to be discharged in a vertical direction at the exit of said head with no retention or entrapment of any of the resin occurring within the head and no tendency to form deleterious effects of the type heretofore found to exist in such so-called sideflow extruder heads used heretofore.

Another object is to provide a sloping surface within the extruder head by which such transition in the change of direction of movement of the resin occurs.

A further object which is ancillary to the foregoing is to provide channel-like surfaces in a direction diverting member within the extruding head which, in conjunction with the overall sloping nature of the surface, further enhances the smooth divertion of the direction of movement of the resin between the angularly related inlet and discharge means of the head.

Further, other and additional objects of the invention will become apparent from the Summary, Detailed Description, Claims and Drawings, which follow hereinafter.

BRIEF SUMMARY OF THE INVENTION

The invention comprises a parison extruding head which has an elongated, substantially vertically extending interior opening within which a bulbous mandrel is mounted for limited longitudinal axial adjustment in opposite directions. A die pin is mounted coaxially within said mandrel and mechanism is provided to move said die pin cyclically in opposite axial directions in accordance with a program to form a parison having desired and regular variations in wall thickness due to the movement of the outer end of the die pin relative to the discharge opening of the extruding head.

The plasticated resin is introduced to the interior of the extruding head through a side opening, the axis of which is substantially perpendicular to that of the head. Thus, it is necessary to divert the direction of the incoming plasticated resin to movement within the longitudinally extending, elongated, annular space between the walls of the interior cavity of the extruding head and the surfaces of the mandrel and die pin which are axially disposed therein. Such diverting of the direction of movement of the resin is accomplished by a flow-diverting sleeve, which surrounds a lower portion of the mandrel which extends below the line of entry of the resin. The upper end of said sleeve, essentially, forms the lower end of the aforementioned annular space within the extruding head.

In order to effect the desired diversion of the plasticated resin from the movement through the laterally extending entrance to passage through the annular space, the upper end of the flow-diverter sleeve slopes upwardly from one side, which is adjacent and coextensive with the inlet opening, to the opposite side of said surface, which is progressively concaved to blend into the substantially vertically extending cylindrical surface in the adjacent portion of the longitudinal annular space within the extruding head. To further enhance the aforementioned transition, at least a portion of the concaved surface of said flow-diverter sleeve increases in depth as it approaches the uppermost end of said sloping surface at the side thereof which is diametrically opposite the inlet opening in said extruding head.

Further, other and additional characteristic features and advantages of the invention will become apparent from the description and claims which follow hereinafter.

DESCRIPTION OF THE DRAWING

FIG. 2 is a larger scale vertical elevation of the flow diverter sleeve per se which is included in the head shown in FIG. 1.

FIG. 3 is a vertical sectional view of the sleeve shown in FIG. 2 as seen on the line 3—3 thereof.

FIG. 4 is a fragmentary, further enlarged vertical sectional elevation of the upper portion of the sleeve shown in FIGS. 2 and 3.

FIG. 5 is a fragmentary vertical sectional view of a portion of the sleeve shown in FIG. 2 as seen on the line 5—5 thereof.

FIG. 6 is a fragmentary vertical sectional view of another portion of the sleeve shown in FIG. 2 as seen on the line 6—6 thereof.

DETAILED DESCRIPTION

Figure 1:
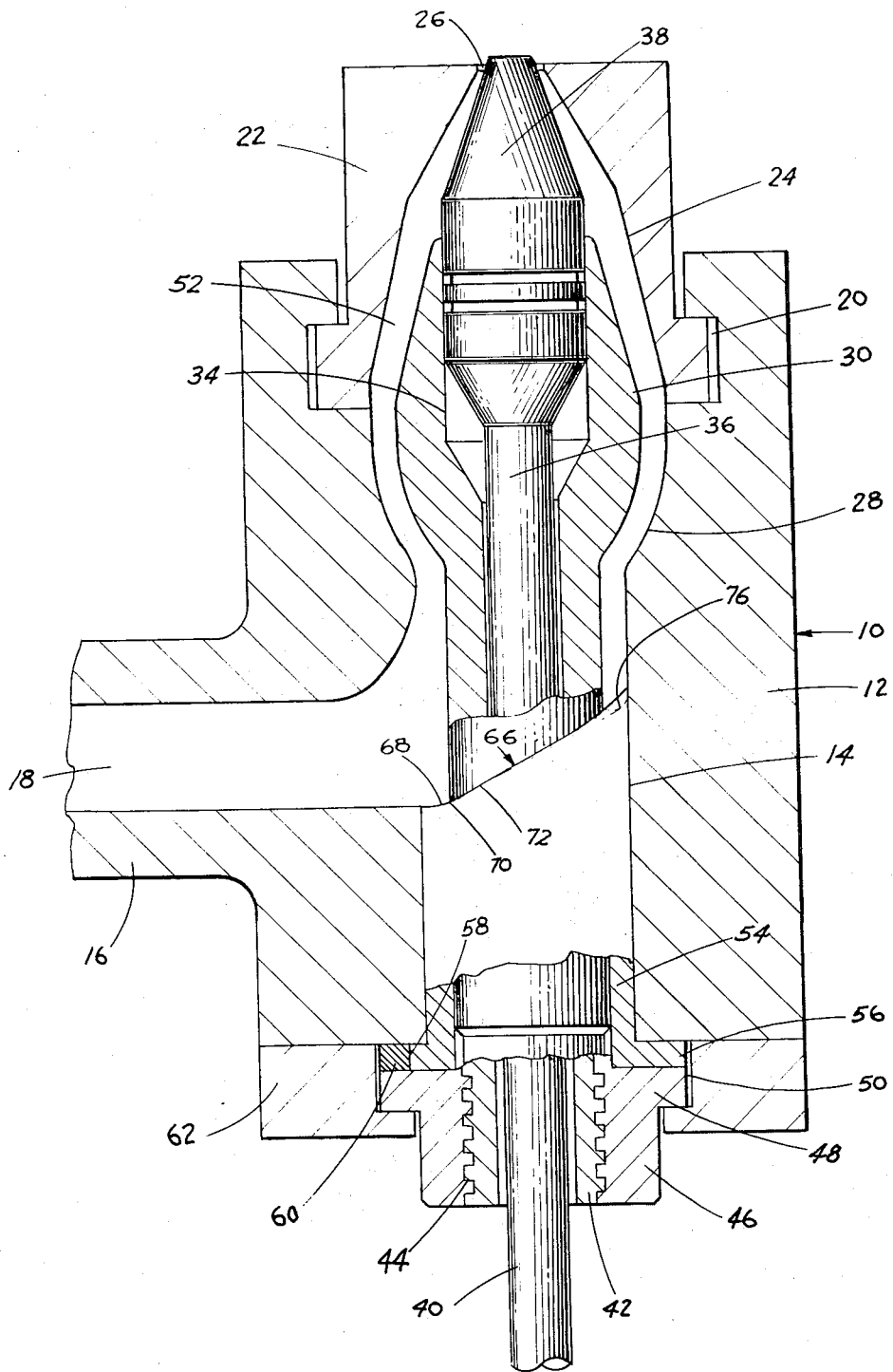
FIG. 1 is a vertical sectional elevation of a parison extruding head of which certain portions are fragmentarily shown and in which the principal features of the invention are illustrated.

Referring to FIG. 1, a preferred embodiment of a parison extruding head assembly 10 is illustrated which comprises a head element 12 having a longitudinally extending opening 14 therein. In use, the head assembly 10 is mounted so that the axis thereof extends substantially vertically adjacent the discharge end of an extruder in which synthetic resin plastic material is blended and plasticated so as to comprise a homogenious melt. The head element 12 is provided with inlet means 16 which extend substantially perpendicularly relative to the axis of the head assembly 10 and is provided with a sideflow opening 18 which also is perpendicular to the longitudinal opening 14 in the head element 12. The sideflow opening 18 communicates directly with the discharge end of an extruder which is not illustrated in the drawing, for purposes of simplicity.

The upper end of the head element 12 is provided with a seat 20 in which a die bushing 22 is detachably connected by conventional means. The bushing 22 has an opening 24 extending therethrough which is of irregular configuration, as illustrated in FIG. 1 and any cross-section thereof preferably is circular unless other configurations are dictated by the shape of the parison to be extruded from the circular discharge port 26 in bushing 22. From FIG. 1, it also will be seen that the upper portion of the longitudinal opening 14 has a somewhat bulbous configuration 28, the upper end of which is smoothly coextensive in configuration with the lower end of the opening 24 in die bushing 22, whereby a somewhat pear-shaped interior configuration is provided at the upper end of the cylindrical longitudinal opening 14. It will be understood, however, that such openings are not restrictive and primarily are for purposes of illustration.

Mounted within the longitudinal opening 14 and the upper portion thereof comprising bulbous portion 28 and opening 24 in die bushing 22 is a mandrel 30, the upper end of which is somewhat bulbous and the lower stem portion 32 is cylindrical in the exemplary illustration shown in FIG. 1. Other configurations of the mandrel than those illustrated may be used, however, depending upon the volume of resin necessary to provide desired variations in thickness which are desired to be provided in the parison to be formed by the head assembly 10.

The mandrel 30 is provided with a central bore 34 of uniform diameter which extends inward from the outer end thereof for purposes of receiving a die pin 36. The outer end 38 of die pin 36 is tapered and the opposite end thereof has an actuation shaft 40, which is illustrated as having a smaller diameter than the pin 36. The lower end of shaft 40 is connected to suitable operating mechanism, such as a servo valve, not shown, as in conventional structure, according to a predetermined program for purposes of providing desired variations in wall thickness in the parison which is extruded from the discharge port 26 of the head assembly 10.

The lower end portion 42 of the stem 32 of the mandrel is externally threaded for coengagement with the threads 44 of a nut 46, which is rotatably supported by means of an upper flange 48 within an annular seat 50. By rotation of the nut 46, the disposition of the bulbous upper portion of the mandrel 30 within the somewhat complementary cavity therefor within the head element 12 and die bushing 22 is determined and maintained. Accurate positioning of the mandrel longitudinally within the opening in the head assembly which receives the same is mandatory for purposes of regulating the rate of flow of homogenious plastic resin through the space 52. The reciprocating cycling of the outer or nose end 38 of die pin 36 varies the wall thickness and thereby determines the wall shape of the parison which is discharged through the discharge port 26.

From the standpoint of function, the above-described operation of the mandrel 30 and die pin 36 is conventional in certain types of extruding heads for forming parisons of varying wall thickness from plasticated plastic resins. The operation of parison extruding heads as described thus far to discharge thermoplastic resin parisons of the type referred to hereinabove to the longitudinally extending passage in the head from a transversely extending inlet opening therein has not met with any appreciable success, due to tendencies of existing heads to impede resin flow and cause retardation and burning of the resin.

The present invention provides a highly satisfactory solution to this problem by providing a flow-diverter sleeve 54, the lower end of which is provided with a radial flange 56 which abuts the flange 48 on nut 46 to provide fixed positioning of the sleeve 54 longitudinally within the opening 14. It also is essential that no rotation of the sleeve 54 shall occur about its axis and this is prevented by providing a keyway 58 in the flange 56 of said sleeve which receives an appropriate key 60 which is fixed relative to collar 62 in which the seat 50 is formed. The collar 62 is detachably connected to the lower end of head element 12 by any suitable means such as a plurality of bolts, not shown.

The central bore 64 of sleeve 54 is of uniform diameter and extends through the full length of said sleeve. Also, the outer diameter of sleeve 54 is very close to the diameter of opening 14 in the head element 12 so that no space is formed therebetween into which the homogenious plastic resin melt can flow. Similarly, the diameter of central bore 64 of the sleeve 54 is very close to the outer diameter of die pin 36 for similar purposes. Accordingly, the upper surface 66 of sleeve 54 comprises a bottom for the space 52 through which the homogenious plastic melt moves for discharge through the port 26.

For details of the nature, configuration, and function of the upper surface 66 of sleeve 54, attention is directed to FIG. 1, but particularly to FIGS. 2–6. In FIG. 1, 3 and 4, it will be seen that the upper surface 66 of the sleeve slopes upwardly from the side nearest opening 18 to the side which is diametrically opposite opening 18 and is illustrated as being substantially as high as the upper side of opening 18, for example. The sloping nature of surface 66 is for purposes of diverting or deflecting the direction of movement of the incoming plasticated resin from a substantially horizontal path to a substantially vertical path. This must be accomplished smoothly, without impedance, and without retention of any of the resin, which, if permitted to become lodged upon said surface or within the lower portion of the space 52, for example, for any appreciable period of time, would be subjected to burning or other similar deleterious effects which could not be tolerated incident to forming products from a parison which is blown into a mold cavity. The configuration of special design which has been embodied in the upper surface 66 of sleeve 54 accomplishes such objective with complete satisfaction. For a concept of the details of all portions of the upper surface 66 of sleeve 54, attention is directed to FIG. 4.

The so-called lower end 68 of surface 66 which is nearest the sideflow opening 18 is substantially horizontal. said surface then curves upwardly at 70. Said curved surface portion 70, however, is actually cylindrical in nature in that it can be formed, for example, by a rotatable milling cutter, the axis of which is normal to the plane upon which the sectional view of FIG. 4 is taken. The upwardly extending curved portion 70 merges into substantially, straight sections 72 which extend angularly upward and are embraced by an illustrative bracket in FIG. 4. Said sections 72 also are flat in a diametrical direction transverse to the axis of sleeve 54, as can be seen from FIGS. 2–5, and continue upwardly substantially to the median line of the bore 64 as viewed in FIGS. 3 and 4. This is also evidenced by the sectional view shown in FIG. 5 which is taken substantially on the median line of the cylindrical flow-diverter sleeve 54.

At the upper end of the relatively flat sections 72, which will be understood to be substantially equal at opposite sides of a plane taken along the line 3—3 in FIG. 2, for example, the upper surface 66 departs from such flat cross-sectional condition and commences to be concaved. This is evidenced from FIG. 6, in which a portion of the progressive concavity 74 is evident. The concavity 74 continues to have increasing depth, however, until the ultimate concaved configuration 76 is provided at the median line along the plane 3—3 of FIG. 2, as shown in FIGS. 3 and 4. This is at the side of the sleeve 54 which is diametrically opposite the side of said sleeve which is adjacent the sideflow inlet opening 18. From FIG. 4 in particular, it will be seen that the upper end 78 of the ultimate concavity 76 is such that the outer cylindrical surface of the sleeve 54 is substantially tangent thereto.

From the foregoing, therefore, it will be seen that the overall angle of the upper surface 66 of the sleeve 54 with respect to the longitudinal axis thereof has been so selected that, when supplemented by the detailed variations therein, such as the upward curve 70, flat sloping sections 72, and the progressive concavity comprising portions 74 and 76 thereof, said overall upper surface 66 is capable of smoothly diverting or deflecting the plasticated resin from movement in a horizontal incoming direction to a substantially vertical discharging direction without impedence of any appreciable nature or entrapment of any of the resin relative to said upper surface 66 or the portion of the sapce 52 which is adjacent the same.

The significance of successfully accomplishing such change in direction is of special importance in regard to feeding a parison of plasticated resin substantially vertically upward for reception between mold sections having cavities into which the parison is blown to form molded objects in such manner that the blowing of the parison occurs while the axis thereof is substantially vertical. This results in ensuring substantially even distribution of the parison within the mold cavity in a transverse direction so as to provide uniform wall thickness which otherwise might not be as readily accomplished under circumstances where, for example, the parison has any tendency to sag or otherwise depart from a substantially straight line con-figuration when the blowing thereof occurs.

While the invention has been described and illustrated in its several preferred embodiments, it should be understood that the invention is not to be limited to the precise details herein illustrated and described since the same may be carried out in other ways falling within the scope of the invention as illustrated and described.

I claim:

1. A parison extruder head assembly connectable to an extruder adapted to form hollow articles from thermoplastic resins by blow-molding the same, said head assembly comprising a head member having a longitudinal opening therein terminating at one end in a discharge port, a mandrel and die pin mounted coaxially within said opening in spaced relation to the sidewalls thereof to form an annular passage, said head having an inlet opening extending into said passage transversely to the axis thereof and adapted to communicate with a source of molten resin, and a flow diverter sleeve surrounding said mandrel and die pin within said passage and the surface of one end of said sleeve defining the opposite end of said passage; said surface being substantially coincident at one side with said inlet opening and sloping therefrom toward said discharge port at the diametrically opposite side of said surface and said sloping surface being at least partially concave in transverse cross-section to augment the sloping effect of said surface and thereby cause substantially unimpeded directional transition in the flow of resin from said inlet opening to and through said annular passage.

2. The parison extruder head assembly according to claim 1 in which said concavity is in said diametrically opposite side of said surface of said flow diverter.

3. The parison extruder head assembly according to claim 1 in which said concavity extends from intermediately between said one side and said diametrically opposite side of said surface and continues to said opposite side of said surface.

4. The parison extruder head assembly according to claim 3 in which said concavity increases in depth from its inception toward said diametrically opposite side of said surface.

5. The parison extruder head assembly according to claim 1 in which said side of said surface adjacent said inlet opening is curved upwardly from said opening about an axis transverse to the axis of said flow diverter sleeve.

6. The parison extruder head assembly according to claim 5 in which the intermediate portions of said surface between said one side and diametrically opposite side thereof are substantially flat in a diametrical direction transverse to the axis of said flow diverter sleeve.

7. The parison extruder head assembly according to claim 6 in which said surface is concave in a radial direction in the portion thereof adjacent said diametrically opposite side of said surface.

8. The parison extruder head assembly according to claim 7 in which the concavity of said surface progressively increases from the inception thereof toward said diametrically opposite side of said surface.

* * * * *